United States Patent
Konnur et al.

(10) Patent No.: US 12,307,118 B2
(45) Date of Patent: May 20, 2025

(54) SYSTEMS AND METHODS FOR IMPROVED MIGRATION OF LARGE LUNs

(71) Applicant: Dell Products L.P., Round Rock, TX (US)

(72) Inventors: Santoshkumar Konnur, Bengaluru (IN); Deepak Vokaliga, Hopkinton, MA (US); Ananthakrishnan Anirudhan, Bangalore (IN); Shruti Asmita, Benares (IN)

(73) Assignee: Dell Products L.P., Round Rock, TX (US)

( * ) Notice: Subject to any disclaimer, the term of this patent is extended or adjusted under 35 U.S.C. 154(b) by 95 days.

(21) Appl. No.: 18/307,885

(22) Filed: Apr. 27, 2023

(65) Prior Publication Data

US 2024/0361941 A1    Oct. 31, 2024

(51) Int. Cl.
*G06F 3/06* (2006.01)

(52) U.S. Cl.
CPC .......... *G06F 3/0647* (2013.01); *G06F 3/0613* (2013.01); *G06F 3/0644* (2013.01); *G06F 3/067* (2013.01)

(58) Field of Classification Search
CPC .......... G06F 3/067; G06F 11/00; G06F 16/13; G06F 16/178; G06F 16/188; G06F 16/27; G06F 16/275; G06F 3/0604; G06F 3/061; G06F 3/0617; G06F 3/0635; G06F 3/0647
See application file for complete search history.

(56) References Cited

U.S. PATENT DOCUMENTS

| | | | |
|---|---|---|---|
| 2021/0374113 A1* | 12/2021 | Ranganathan | G06F 16/215 |
| 2022/0398038 A1* | 12/2022 | Anchi | G06F 3/0611 |

* cited by examiner

*Primary Examiner* — Yong J Choe
(74) *Attorney, Agent, or Firm* — DALY, CROWLEY, MOFFORD & DURKEE, LLP (57) ABSTRACT

An example methodology includes, by a computing device, receiving a request to migrate a logical unit number (LUN) from a source array to a target array and, responsive to a determination that the LUN is a large LUN, dividing the large LUN into a plurality of partitions, creating a number of sessions corresponding to the plurality of partitions, wherein each session of the created sessions is operable to migrate data from a partition of the plurality of partitions, and initiating the created sessions to start copying data from the respective partitions in parallel. The method may also include, by the computing device, responsive to a determination that the LUN is not a large LUN, creating a single session operable to migrate data from the LUN and initiating the single session to start copying data from the LUN.

20 Claims, 5 Drawing Sheets

SYSTEMS AND METHODS FOR IMPROVED MIGRATION OF LARGE LUNs

BACKGROUND

Storage device migration may include transferring data from one storage device to another storage device. Such data migration between the storage devices can be performed for various reasons. For example, an owner of a data storage array may replace the storage array with a newer array with perhaps more capacity, faster processors, newer and higher performance components, and/or additional features. Data migration applications (e.g., Open Replicator for Symmetrix (ORS), available from DELL EMC of Hopkinton, Massachusetts) are available that facilitate copying of data to enable effective data migration from an original array (or "source array") to a replacement array (or "target array").

One approach to data migration involves replicating the data via a pull mechanism in which the data replication is initiated from the target array. For example, the target array may scan for the tracks to be copied from the source array. The target array may then send requests to the source array to obtain the tracks that need to be copied.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by a computing device, receiving a request to migrate a logical unit number (LUN) from a source array to a target array and, responsive to a determination that the LUN is a large LUN, dividing the large LUN into a plurality of partitions, creating a number of sessions corresponding to the plurality of partitions, wherein each session of the created sessions is operable to migrate data from a partition of the plurality of partitions, and initiating the created sessions to start copying data from the respective partitions in parallel. The method may also include, by the computing device, responsive to a determination that the LUN is not a large LUN, creating a single session operable to migrate data from the LUN and initiating the single session to start copying data from the LUN.

In some embodiments, the plurality of partitions is based on sizes of partitions passed with the request to migrate the LUN.

In some embodiments, the plurality of partitions is based on use of a trained model to determine sizes of partitions.

In some embodiments, each session of the created sessions is assigned a priority. In one aspect, the priority assigned to each session is based on priorities specified for the plurality of partitions passed with the request to migrate the LUN. In another aspect, the priority assigned to each session is based on access data maintained for the plurality of partitions.

In some embodiments, each session of the created sessions is assigned a mode of operation for migrating the plurality of partitions.

In one aspect, the mode of operation includes a cold pull. In one aspect, the mode of operation includes a hot pull. In one aspect, the mode of operation includes a hot pull with donor update.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

In a pull replication from a source array (also known as a "remote device") to a target array (also known as a "control device"), replication operations can be controlled from a host attached to the target array. The data can be copied through a storage area network (SAN) infrastructure. In order for the data to be copied, a SAN for the source array needs to have connectivity with a SAN for the target array. Various inefficiencies can arise with respect to the movement of data from a source array to a target array. For example, it may take upwards of about 20 hours to migrate larger source arrays, such as source arrays of about 1 terabyte (TB) or larger. In addition, since the scanning and copying of the data operates on the device level, the requests to copy the tracks are generated in a sequential manner. This further adds to the time taken before the data can be made available, for example, to an application since the entire data needs to be migrated from the source array to the target array before permitting access to even a portion of the data.

Disclosed herein are concepts, structures, and techniques for improved migration of large logical unit numbers (LUNs). The improved migration performance can be achieved by dividing a large LUN into smaller and manageable sections and scanning and migrating the smaller sections in parallel to effectively decrease the time to migrate the large LUN. A memory size threshold for processing as a large LUN, such as, for example, 1 TB, 1.5 TB, 2 TB, etc., can vary depending on the configuration of the processor(s), memory (e.g., random access memory), and secondary storage (e.g., flash drive) of the underlying system on which the LUN is created. For instance, for a given system configuration, if a LUN of a particular size slows down the migration of the LUN on the system, that particular size LUN can be considered a large LUN for that system configuration. The memory size threshold for processing as a large LUN may be configured as part of a data migration policy or a user preference.

In some embodiments, a migration manager operates as a layer between a user interface and a target storage array (also referred to herein more simply as a "target array"). In some such embodiments, the migration manager can logically divide a large LUN that is being migrated from a source array to the target array into multiple smaller partitions. The migration manager can then create (or "generate") a corresponding number of sessions (e.g., a same number of sessions as the number of partitions) on the target array for migrating the multiple smaller partitions in parallel from the source array. According to some embodiments, migration of a LUN using multiple parallel sessions may be provided as a user selectable feature. For example, a user may selectably enable a parallel session migration feature to migrate a LUN using multiple parallel sessions. If this feature is enabled, the migration manager can migrate the LUN using multiple parallel sessions. Otherwise, if this feature is not enabled (e.g., the feature is disabled), the migration manager can migrate the LUN using a single session.

According to some embodiments, the migration manager may associate a mode of operation to the individual partitions of a large LUN. A mode of operation may indicate the type of migration, such as, for example, cold pull, hot pull, and hot pull with donor update, that is to be performed by the sessions when migrating the partitions. For example, the migration manager may allow a user to specify a mode of operation for the individual partitions of the large LUN. According to some embodiments, the migration manager may leverage a learning algorithm to intelligently determine an optimal size for the individual partitions. For example, if the user does not specify the sizes of the individual partitions, the migration manager can utilize the learning algorithm to intelligently determine the optimal size for the partitions that provides the improved migration performance. Among other technical benefits, utilizing multiple parallel sessions to migrate a large LUN from a source array significantly improves the migration performance. Numerous configurations and variations will be apparent in light of this disclosure.

As used herein, the term "user" refers, in addition to its ordinary meaning, to a person or thing that uses something, either stated or implied. For example, a user can be any person, system, or other entity that uses a storage system to migrate data from a source array to a target array. A user may be a human or a non-human (e.g., an application or a system).

As used herein, the term "logical unit number" (LUN) refers, in addition to its ordinary meaning, to a logical unit (LU) provided by a storage system for accessing data from the storage system. A LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines.

In addition, in the implementations that follow, it should be understood that, although certain specific embodiments may use particular brands and names of products (e.g., Dell EMC products, etc.,), none of the embodiments described herein are intended to be limited to using products from any vendor.

Figure 1:
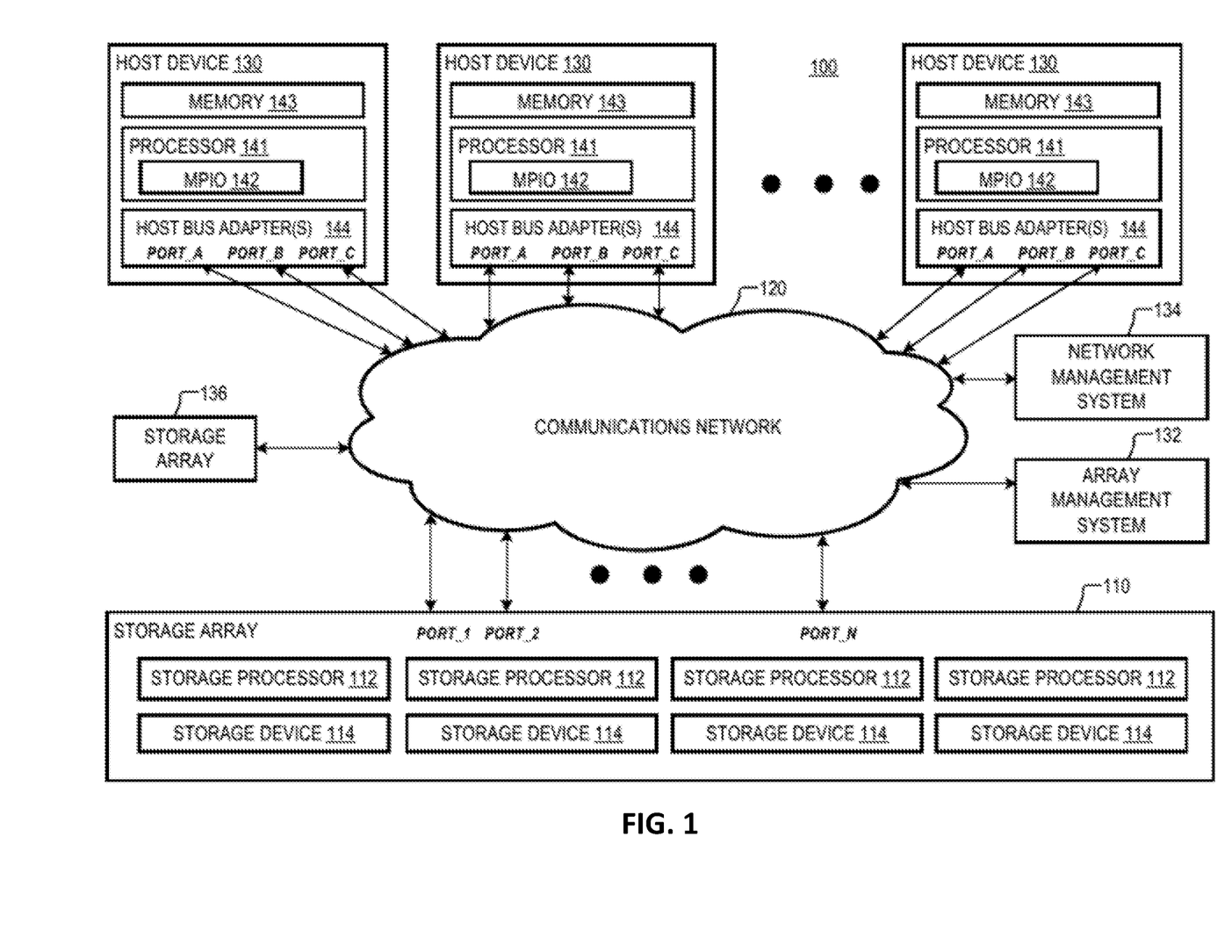
FIG. 1 is a block diagram of an illustrative storage system within which embodiments of the present disclosure may be utilized.

FIG. 1 is a diagram of an example of a storage system 100 within which embodiments of the present disclosure may be utilized. As illustrated, system 100 may include a storage array 110, a communications network 120, a plurality of host devices 130, an array management system 132, a network management system 134, and a storage array 136.

Storage array 110 may include a plurality of storage processors 112 and a plurality of storage devices 114. Each of the storage processors 112 may include a computing device that is configured to receive I/O requests from any of the host devices 130 and execute the received I/O requests by reading or writing data to storage devices 114. In some implementations, each of the storage processors 112 may have an architecture that is the same or similar to the architecture of a computing device 500 of FIG. 5. Storage processors 112 may be located in the same geographic location or in different geographic locations. Similarly, storage devices 114 may be located in the same geographic location or different geographic locations. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, storage devices 114 may be arranged in one or more Redundant Array(s) of Independent Disks (RAID) arrays. Communications network 120 may include one or more of the Internet, a local area network (LAN), a wide area network (WAN), a fibre channel (FC) network, and/or any other suitable type of network.

Each of the host devices 130 may include a laptop, a desktop computer, a smartphone, a tablet, an Internet-of-Things device, and/or any other suitable type of electronic device that is configured to retrieve and store data in storage arrays 110 and 136. Each host device 130 may include a memory 143, a processor 141, and one or more host bus adapters (HBAs) 144. Memory 143 may include any suitable type of volatile and/or non-volatile memory, such as a solid-state drive (SSD), a hard disk (HD), a random-access memory (RAM), a Synchronous Dynamic Random-Access Memory (SDRAM), etc. Processor 141 may include any suitable type of processing circuitry, such as a general-purpose process (e.g., an x86 processor, a MIPS processor, an ARM processor, etc.), a special-purpose processor, an application-specific integrated circuit (ASIC), a field programmable gate array (FPGA), etc. Each of the HBAs 144 may be a circuit board or integrated circuit adapter that connects a respective one of the host devices 130 to storage array 110 (and/or storage array 136). In other words, each of the HBAs 144 may include a communications interface for connecting to communications network 120, storage array 110, and/or storage array 136. Although in the example of FIG. 1 each of the host devices 130 is provided with at least one HBA 144, alternative implementations are possible in which each of the host devices is provided with another type of communications interface, in addition to (or instead of) an HBA. The other type of communications interface may include one or more of an Ethernet adapter, a WiFi adapter, a local area network (LAN) adapter, etc.

Each processor 141 may be configured to execute a multi-path I/O (MPIO) driver 142. MPIO driver 142 may comprise, for example, PowerPath TM drivers from Dell EMC™, and/or other types of MPIO drivers that are arranged to discover available communications paths with any of the host devices 130 and the storage array 110. MPIO driver 142 may be configured to select I/O operations from any of the I/O queues of host devices 130. The sources of the I/O operations stored in the I/O queues may include respective processes of one or more applications executing on host devices 130.

HBA 144 of each of the host devices 130 may include one or more ports. Specifically, in the example of FIG. 1, HBA 144 of each of the host devices 130 includes three ports, which are herein enumerated as "port A", "port B", and "port C". Furthermore, storage array 110 may also include a plurality of ports. In the example of FIG. 1, the ports in storage array 110 are enumerated as "port 1", "port 2," and "port N", where N is a positive integer greater than 2. Each of the ports in host devices 130 may be coupled to one of the ports of the storage array via a corresponding network path. The corresponding network path may include one or more hops in communications network 120. Under the nomenclature of the present disclosure, a network path spanning between an HBA port of one of host devices 130 and one of the ports of the storage array 110 is referred to as a "network path of that host device 130".

Figure 5:
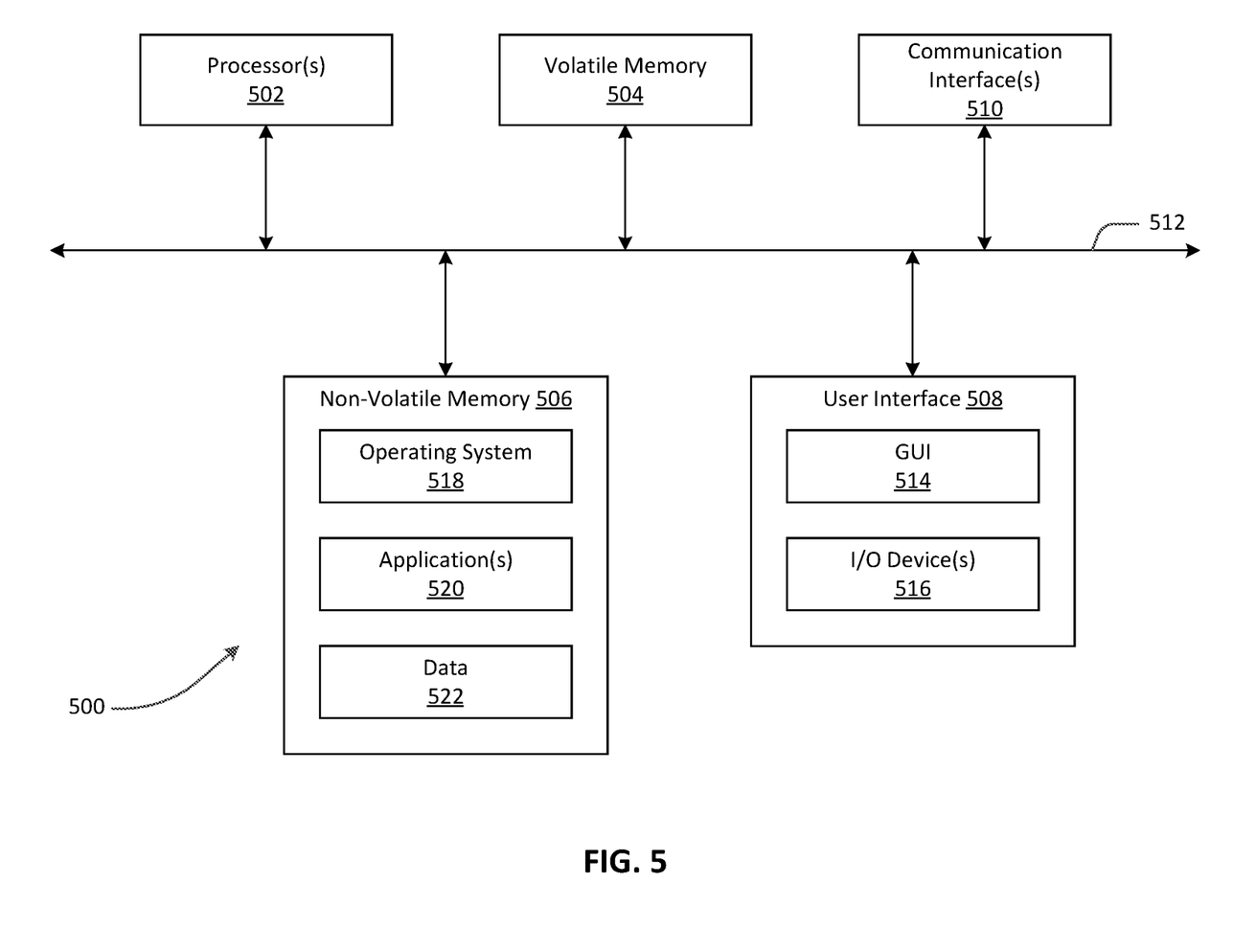
FIG. 5 is a block diagram illustrating selective components of an example computing device in which various aspects of the disclosure may be implemented, in accordance with an embodiment of the present disclosure.

Array management system 132 may include a computing device, such as computing device 500 of FIG. 5. Array management system 132 may be used by a system administrator to re-configure storage array 110, e.g., when degraded performance of storage array 110 is detected.

Network management system 134 may include a computing device, such as computing device 500 of FIG. 5. Network management system 134 may be used by a network administrator to configure communications network 120 when degraded performance of communications network 120 is detected.

Storage array 136 may be the same or similar to storage array 110. Storage array 136 may be configured to store the same data as storage array 110. Storage array 136 may be configured to operate in either active-active configuration with storage array 110 or in active-passive configuration. When storage arrays 110 and 136 operate in active-active configuration, a write request to either of storage arrays 110 and 136 is not acknowledged back to the sender until the data associated with the write request is written to both of the storage arrays 110 and 136. When storage arrays 110 and 136 are operated in active-passive configuration, a write request to a given one of the storage arrays 110 and 136 is acknowledge for as long the data associated with write request is written to the given one of the storage arrays 110 and 136 before the writing to the other one of the storage arrays is completed.

Figure 2:
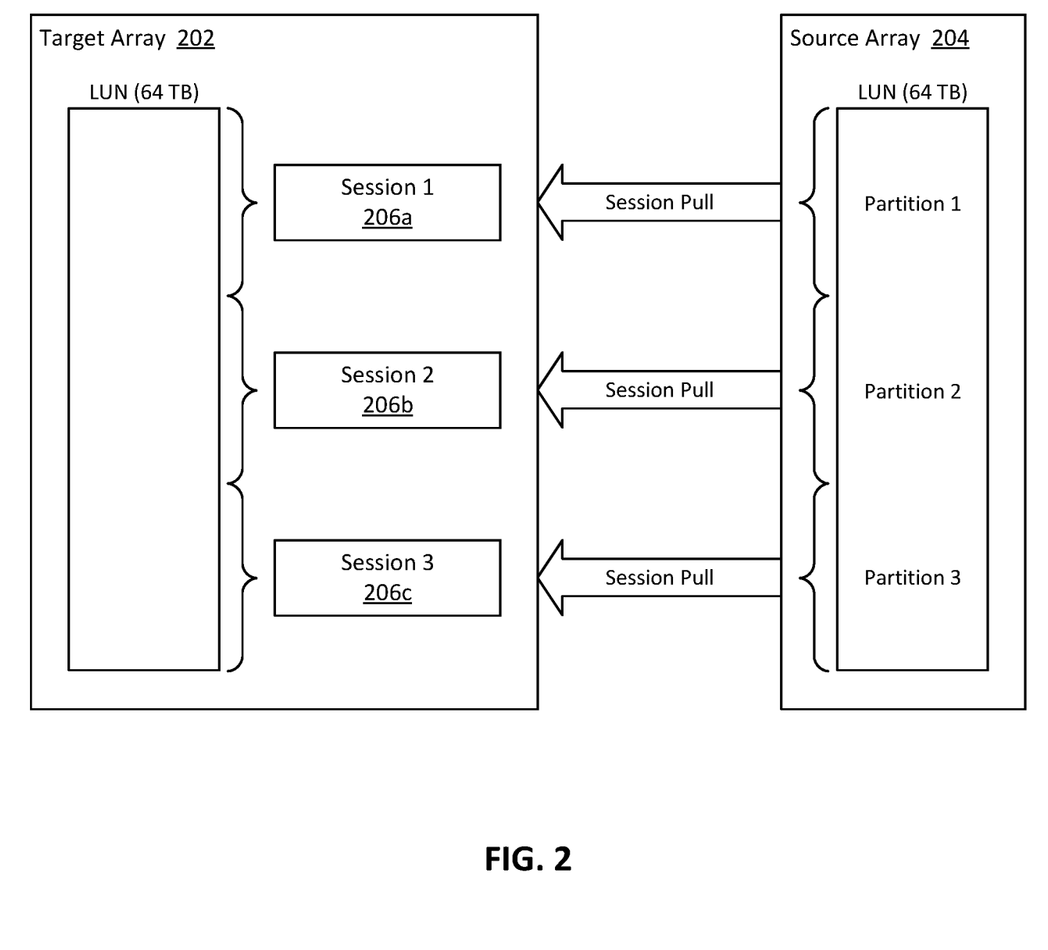
FIG. 2 is a simplified diagram showing an example system topology that can be used to migrate a LUN using multiple parallel sessions, in accordance with an embodiment of the present disclosure.

Referring now to FIG. 2, shown is a simplified diagram illustrating an example system topology that can be used to migrate a LUN using multiple parallel sessions, in accordance with an embodiment of the present disclosure. Such a topology can be understood as a process by which a target array 202 leverages the services of multiple sessions 206a-206c (206 generally) to provide finer control of and improved performance in migrating large LUNs from a source array 204. To promote clarity in the drawings, FIG. 2 shows three sessions 206, session 1, session 2, and session 3. However, it will be appreciated that there may be a different number of sessions, such as two or four or more, and that the number of sessions 206 can correspond to the number of partitions that are being migrated from source array 204.

In the example of FIG. 2, a large LUN, such as, for example, a 64 TB LUN, is being migrated from source array 204 to target array 202. For example, a user can request migration of the large LUN on source array 204 to target array 202. To perform the migration, the large LUN on source array 204 can be first logically divided (or "segmented") into a multiple number of smaller partitions. In the example of FIG. 2, the large LUN may be divided into three partitions, partition 1, partition 2, and partition 3. A number of sessions corresponding to the number of partitions can then be created on target array 202. As shown, in the example of FIG. 2, since the large LUN on source array 204 is logically divided into three partitions, three sessions 206a, 206b, 206c can be created on target array 202. In some embodiments, sessions 206 created on target array 202 can be Open Replicator (OR) sessions. The individual sessions 206 can then be initiated to start copying data from the respective partitions in parallel. For example, session 206a can be initiated to start copying data from partition 1, session 206b can be initiated to start copying data from partition 2, and session 206c can be initiated to start copying data from partition 3.

In some embodiments, the individual partitions can be subdivided into logical tracks, and the individual tracks in the partition can be copied to target array 202. Note that, as used herein, a logical track is an abstract concept, and not a track in the physical sense (e.g., not a physical division of data in a disk drive). For example, each partition can be divided into tracks, where each track is of a predetermined size such as 128 KB or another suitable size. The size of a track may be configured as part of a data migration policy or a user preference. In some such embodiments, the individual sessions 206 can maintain a bitmap of tracks that need to be copied. Maintaining a bitmap enables the individual sessions 206 to keep track of the data units to be copied from source array 204. For instance, in the example of FIG. 2, session 206a may set a bit in a bitmap for each track that needs to be copied in partition 1. Similarly, session 206b may set a bit in a bitmap for each track that needs to be copied in partition 2, and session 206c may set a bit in a bitmap for each track that needs to be copied in partition 3. In one implementation, the individual sessions 206 can initialize the bits (e.g., bit=1) for each track to be copied when session 206 is created. Session 206 can then search/scan or otherwise analyze the bits in the bitmap to determine the tracks that need to be copied. After session 206 copies (e.g., pulls) a track in the partition, session 206 can clear the bit (e.g., bit=0) for that track in the bitmap. Once all the bits in the bitmap are cleared, session 206 can declare the migration of the partition to be complete and move to a session done state. Migration of the large LUN from source array 204 to target array 202 can be declared complete once migration of the three partitions, partition 1, partition 2, and partition 3, are complete. In other words, migration of the large LUN from source array 204 to target array 202 can be declared complete once the three sessions 206 created for copying data from the three partitions are all in the session done state.

In some embodiments, the individual sessions 206 may be associated with a respective priority. For example, a user can specify a priority for the individual partitions when requesting migration of the large LUN on source array 204 to target array 202. The priority assigned to a partition may indicate the relative importance of the migration of the partition. The sessions created for migrating the higher priority partitions can be given priority (e.g., more processing cycles, more bandwidth, etc.) over sessions created for migrating the lower priority partitions. For instance, in the example of FIG. 2, suppose partition 1 is assigned a higher priority than partition 2, and that partition 2 is assigned a higher priority than partition 3. In this example, session 206a can be given higher priority than session 206b, and session 206b can be given higher priority than session 206c. For example, in one implementation, the tracks in partition 1 can be migrated first, followed by the tracks in partition 2, then the tracks in partition 3. In another implementation, requests for the tracks in partition 1 can be prioritized over requests for the tracks in partition 2 and partition 3, and requests for the tracks in partition 2 can be prioritized over requests for the tracks in partition 3.

In some embodiments, the individual sessions 206 may be associated with a mode of operation. For example, a user can specify a mode of operation for the individual partitions when requesting migration of the large LUN on source array 204 to target array 202. The mode of operation assigned to a partition may indicate the type of migration, such as, for example, cold pull, hot pull, and hot pull with donor update, that is to be performed by session 206 when migrating the partition from source array 204 to target array 202. For example, if a partition is assigned a cold pull operation, the session created to migrate the partition can perform a cold pull migration (e.g., an Open Replicator cold pull migration in the case of an OR session). Similarly, if the partition is assigned a hot pull operation, the session created to migrate the partition can perform a hot pull migration (e.g., an Open Replicator hot pull migration in the case of an OR session). If the partition is assigned a hot pull with donor update operation, the session created to migrate the partition can perform a hot pull with donor update migration (e.g., an Open Replicator hot pull migration with donor update in the case of an OR session). In a cold pull migration, target array 202 is not ready (offline) for host access while data transfer (e.g., copy operation) is in progress. In this regard, a cold pull migration can be thought of as an offline migration. In a hot pull migration, host access of target array 202 is permitted while data transfer (e.g., copy operation) is in progress. When a hot pull migration session is initiated, data on target array 202 is pulled from source array 204 before a new read or write to target array 202 is permitted. In this regard, a hot pull migration can be thought of as an online migration. In a hot pull with donor update migration, in addition to including the features of a hot pull migration, all host writes to target array 202 are propagated (donor update) to the corresponding source array 204. In some implementations, a special flag, such as the ORS Write Pending flag (ORS_WP), may be used to denote donor update.

Figure 3:
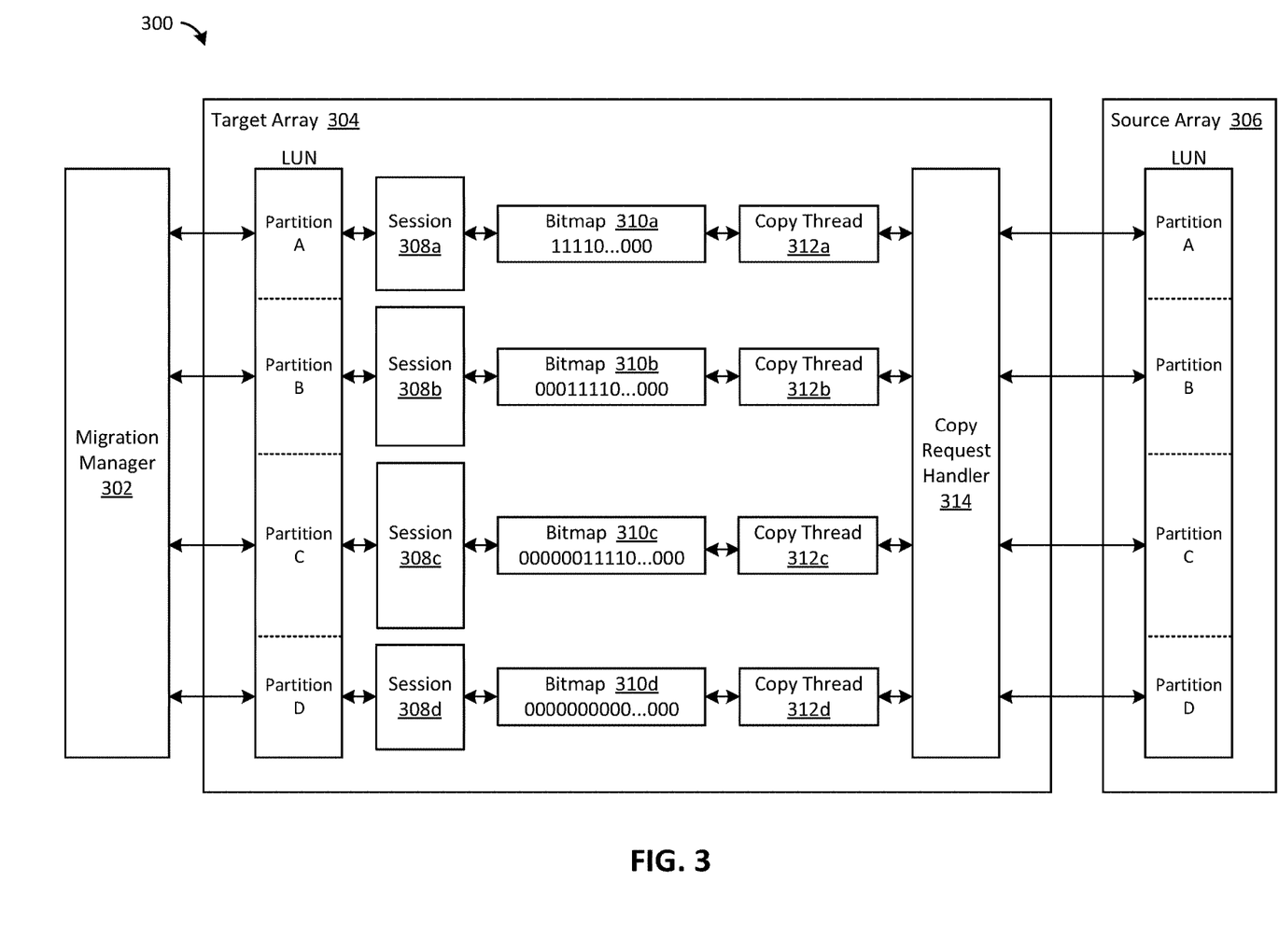
FIG. 3 is a block diagram of an illustrative system for migration of a LUN using multiple parallel sessions, in accordance with an embodiment of the present disclosure.

FIG. 3 is a block diagram of an illustrative system 300 for migration of a LUN using multiple parallel sessions, in accordance with an embodiment of the present disclosure. Illustrative system 300 includes a migration manager 302 configured to communicate with a target array 304 via one or more communication networks (not shown). The communication networks can include, for example, the Internet, LANs, WANs, FC networks, etc. In some embodiments, migration manager 302 and target array 304 may correspond to array management system 132 and storage array 110 of FIG. 1, respectfully. In some embodiments, target array 304 may include a block storage array, such as the DELL EMC PowerMax™ storage array. To promote clarity in the drawings, FIG. 3 shows migration manager 302 communicably coupled to a single target array 304. However, it will be appreciated that migration manager 302 may be communicably coupled to more than one target array 304.

In some embodiments, migration manager 302 is operable to manage migrations of data from one storage device (e.g., a source array) to another storage device (e.g., a target array). To this end, according to some embodiments, migration manager 302 may be implemented as a layer between a user interface (UI) and a target array, such as, for example, target array 304. In such implementations, migration manager 302 is operable to interpret data migration commands, such as, for example, ORS Open Minimally Disruptive Migration (OMDM) commands, issued or otherwise generated by a user. For example, the UI can provide a UI element/control, such as a button, a checkbox, or other type of control, for selectably enabling a parallel session migration feature for migrating large LUNs using multiple parallel sessions. The UI can also provide UI elements/controls for inputting (specifying) information about a source array, a target array, a LUN that is to be migrated, sizes of the partitions (i.e., partition sizes), priorities of the partitions, and modes of operation for the partitions. The UI can also include a UI control/element that may be clicked/tapped to request migration of the LUN from the source array to the target array. Additionally or alternatively, migration manager 302 may provide an application program interface (API) which can be utilized to selectably enable the parallel session migration feature, specify information about a LUN that is to be migrated, and request migration in accordance with the specified information. The provided API may be utilized by the UI and/or applications to communicate with migration manager 302. In any case, upon determining that a migration is of a large LUN, migration manager 302 is operable to logically divide the large LUN into multiple partitions and create, monitor, and terminate a corresponding number of sessions to migrate the multiple partitions in parallel.

In more detail, according to one embodiment, migration manager 302 can determine whether a LUN that is being migrated is a large LUN. For example, in response to receiving a request for migration of a LUN from a source array to a target array, migration manager 302 can determine whether the parallel session migration feature is enabled for the requested migration. If the parallel session migration feature is not enabled (e.g., the parallel session migration feature is disabled for the requested migration), migration manager 302 can migrate the LUN using a single session. For example, migration manager 302 can create a session, such as, for example, an OR session, operable to migrate data from the LUN and initiate the session to start copying data from the LUN. If the parallel session migration feature is enabled, migration manager 302 can determine whether the LUN is a large LUN. If it is determined that the LUN is not a large LUN, migration manager 302 can migrate the LUN using a single session.

If it is determined that the LUN is a large LUN, migration manager 302 can logically divide the large LUN into a multiple number of smaller partitions. The number of partitions for dividing the large LUN (e.g., the number of partitions to generate) may be determined from information passed with the request for migration of the LUN. For example, sizes of the individual partitions may be passed with the request for migration of the LUN (e.g., a user may specify sizes of the partitions as input parameters with the request for migration of the LUN). Migration manager 302 can then logically divide the large LUN into an appropriate number of partitions based on the specified sizes of the partitions. If the number of partitions to generate is not passed with the request for migration of the LUN, migration manager 302 can intelligently divide the large LUN into an appropriate number of partitions. For example, according to one embodiment, migration manager 302 can leverage a learning algorithm to divide the large LUN into smaller partitions. In some such embodiments, the learning algorithm may be trained using different partition sizes, which enables the trained model to determine partition sizes that provide optimal migration performance. Migration manager 302 can then use the trained model to determine the sizes of the partitions and divide the large LUN into an appropriate number of partitions based on the determined sizes of the partitions.

Upon dividing the large LUN into multiple smaller partitions, migration manager 302 can create a corresponding number of sessions on the target array, where the number of sessions created corresponds to the number of partitions in the large LUN. The individual sessions created on the target array are operable to migrate data from a respective partition in the source array. For instance, as shown in FIG. 3, suppose the large LUN is on a source array 306 and the request is to migrate the large LUN from source array 306 to target array 304. Also suppose that migration manager 302 divides the large LUN into four partitions, partition A, partition B, partition C, and partition D. As shown, in the example of FIG. 3, migration manager 302 can create four sessions 308a-308d (308 generally) on target array 304, wherein session 308a is operable to migrate data from partition A, session 308b is operable to migrate data from partition B, session 308c is operable to migrate data from partition C, and session 308d is operable to migrate data from partition D.

In some embodiments, for each created session, migration manager 302 can generate a bitmap of tracks that need to be copied in the corresponding partition. In one implementation, migration manager 302 can initialize the bits (e.g., bit=1) in the bitmaps for each track to be copied. Migration manager 302 can then initiate the sessions to start copying data from the respective partitions in parallel. In the example of FIG. 3, migration manager 302 can generate a bitmap 310a for session 308a, a bitmap 310b for session 308b, a bitmap 310c for session 308c, and a bitmap 310d for session 308d. Bitmap 310a can include a bit for each track that needs to be copied in partition A, bitmap 310b can include a bit for each track that needs to be copied in partition B, bitmap 310c can include a bit for each track that needs to be copied in partition C, and bitmap 310d can include a bit for each track that needs to be copied in partition D. Migration manager 302 can initialize the bits in bitmaps 310a-310d to indicate that the tracks need to be copied. Migration manager 302 can then initiate sessions 308a-308d to start copying data from their respective partitions in parallel. In particular, in the example of FIG. 3, migration manager 302 can initiate session 308a to start copying data from partition A, initiate session 308b to start copying data from partition B, initiate session 308c to start copying data from partition C, and initiate session 308d to start copying data from partition D.

When initiated, according to some implementations, the individual sessions may execute a thread of execution (also known as a "thread") to copy data from their respective partition. In the example of FIG. 3, session 308a can execute a copy thread 312a to copy data from partition A, session 308b can execute a copy thread 312b to copy data from partition B, session 308c can execute a copy thread 312c to copy data from partition C, and session 308d can execute a copy thread 312d to copy data from partition D. Copy thread 312a can search/scan bitmap 310a to determine the tracks that need to be copied in partition A. To copy a track, copy thread 312a can send a request to a copy request handler 314 to copy the track in partition A. In response, copy request handler 314 can pull the requested track from partition A of the large LUN on source array 306. Copy request handler 314 can send a response to copy thread 312a that includes the pulled track (e.g., a response that includes the data in the pulled track). Upon receiving the requested track from copy request handler 314, copy thread 312a can copy the track to a partition A of a LUN on target array 304. Upon successfully copying the track to the LUN on target array 304, copy thread 312a can clear the bit for the copied track in bitmap 310a. Clearing the bit in this manner provides copy thread 312a an indication that the track has been successfully copied from source array 306 to target array 304. Copy thread 312a can then search/scan bitmap 310a to determine whether there are other tracks that need to be copied in partition A and copy the other tracks that need to be copied in partition A. Once all the bits in bitmap 310a are cleared, session 308a can declare the migration of partition A to be complete and move to a session done state. Copy threads 312b, 312c, 312d can utilize bitmaps 310b, 310c, 310d, respectfully, to copy tracks in partition B, partition C, partition D, respectfully, in a manner substantially similar to that described above for copy thread 312a.

Referring again to migration manager 302, migration manager 302 can continually monitor the status of the sessions initiated to copy the partitions of the large LUN. Migration manager 302 can indicate the migration of the large LUN to be complete once the statuses of all the initiated sessions are in a session done state. Migrating a large LUN using multiple parallel sessions to copy respective partitions of the large LUN provides yet another technical advantage in that, if a copy of a partition fails for any reason, only the session associated with the failed copy needs to be restarted and not the other sessions. In addition, once a copy of a partition is complete, I/Os to that partition can be allowed even in the case where other partitions of the large LUN are still being copied. In general, using multiple parallel sessions to migrate a large LUN as variously described herein provides improved migration performance and efficient utilization of resource (e.g., efficient utilization of computing resources).

In some embodiments, migration manager 302 can assign a priority to the individual sessions created for migrating the partitions of the large LUN. For example, priorities of the individual partitions may be passed with a request for migration of a LUN. Migration manager 302 can then assign a priority to the individual sessions based on the specified priorities of the partitions. For example, if low priority is specified for a particular partition, migration manager 302 can assign a low priority to a session created to migrate the partition. In some embodiments, migration manager 302 can intelligently assign a priority to the individual sessions. For example, according to one embodiment, migration manager 302 can maintain data (e.g., a heatmap) about what partition(s) is more frequently accessed and assign priorities to the partitions based on the partition access data. That is, migration manager 302 can maintain access data for the partitions and assign priorities to the partitions based on the partition access data.

In some embodiments, migration manager 302 can assign a mode of operation to the individual sessions created for migrating the partitions of the large LUN. For example, modes of operation for the individual partitions may be passed with the request for migration of the LUN. Migration manager 302 can then assign a mode of operation to the individual sessions based on the modes of operation specified for the partitions. For example, if a hot pull operation is specified for a particular partition, migration manager 302 can assign a hot pull mode of operation to a session created to migrate the partition, thereby causing the session to perform a hot pull migration of the partition. As another example, if a cold pull operation is specified for a particular partition, migration manager 302 can assign a cold pull mode of operation to a session created to migrate the partition, thereby causing the session to perform a cold pull migration of the partition. In any case, assignment of priorities and/or modes of operation to the sessions beneficially allows for finer control of the migration of large LUNs.

Figure 4:
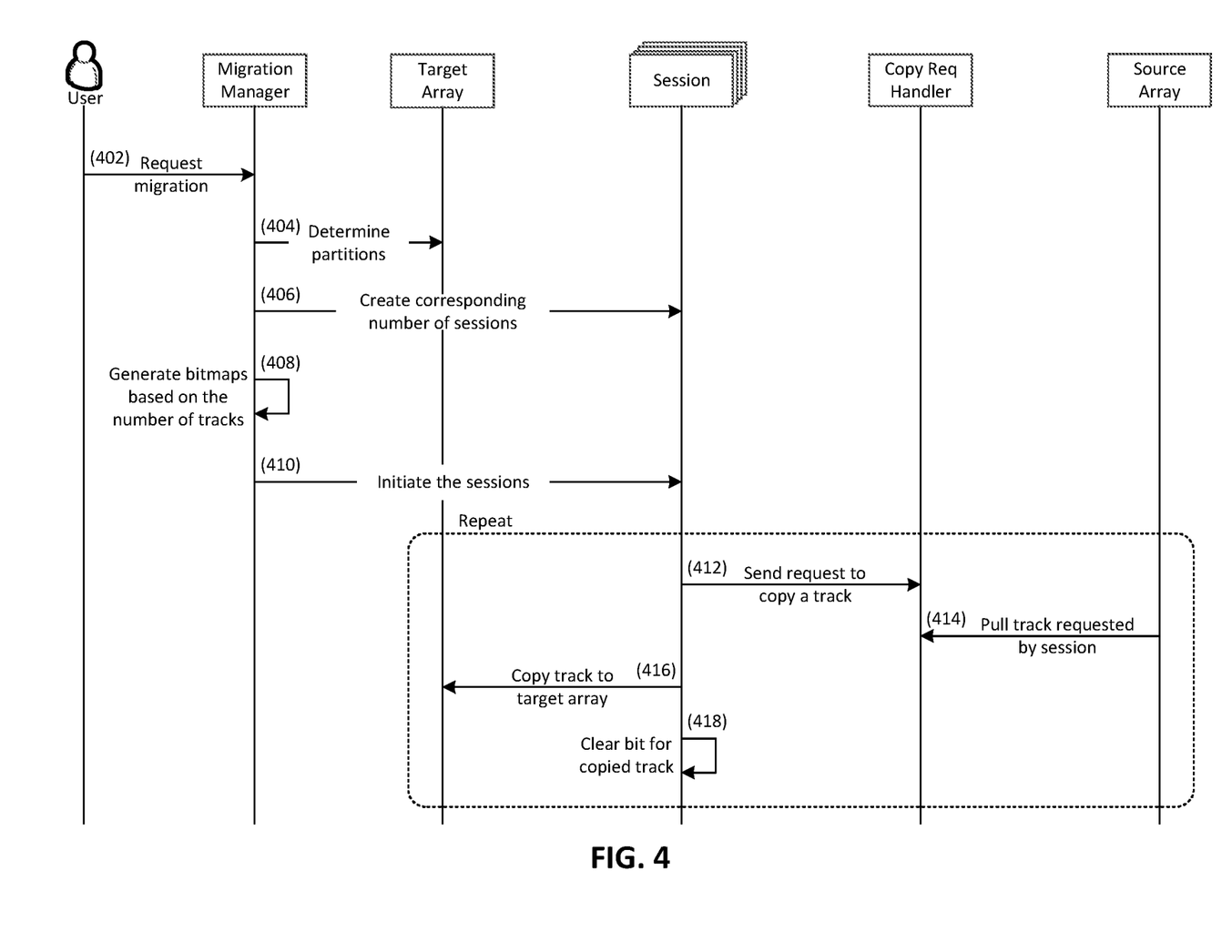
FIG. 4 is a sequence diagram showing an example flow of interactions between various components to migrate a LUN using multiple parallel sessions, in accordance with an embodiment of the present disclosure.

FIG. 4 is a sequence diagram showing an example flow of interactions between various components to migrate a LUN using multiple parallel sessions, in accordance with an embodiment of the present disclosure. For example, the interactions may be between various components of system 300 of FIG. 3 to migrate a LUN. For purposes of this discussion, the requested migration may be of a large LUN from a source array to a target array.

In the example of FIG. 4, a user using a computing device may utilize a migration manager (e.g., migration manager 302) to request migration of the large LUN (402). In response to receiving the request, the migration manager may determine the partitions of the large LUN (404). For example, the determined partitions can correspond to the logical division of the large LUN into smaller portions. The migration manager may create a number of sessions corresponding to the number of partitions (406). The individual sessions may be operable to migrate data from a respective partition in the large LUN. The migration manager may then generate a bitmap for each created session based on the number of tracks in the partition corresponding to the session (408). The migration manager may initialize the bits in the bitmaps for each track to be copied in the partitions. For example, the migration manager can set the bits (e.g., bit=1) to indicate that the tracks need to be copied. The migration manager may then initiate the created sessions to start copying data from the respective partitions in parallel (410).

In response, the individual sessions may send a request to a copy request handler (e.g., copy request handler 314) to copy a track in a respective partition (412). For example, the individual session can identify the track that needs to be copied from the bitmap generated for the session. In response to each request, the copy request handler may pull the requested track from the partition of the large LUN on the source array (414). Upon pulling the requested track, the copy request handler may send the track to the session that requested the track (e.g., send the track in a response to the request). In response to receiving the requested track, the individual sessions may copy the tracks to the appropriate partitions of a LUN on the target array (416). Upon successfully copying the track to the target array, the individual sessions may clear the bit for the track in the bitmap (418). Clearing the bit in the bitmap can serve as an indication that the track represented by the bit has been copied from the source array to the target array. The individual sessions may then repeat operations 412-418 as needed to copy other tracks that need to be copied from the source array to the target array.

FIG. 5 is a block diagram illustrating selective components of an example computing device 500 in which various aspects of the disclosure may be implemented, in accordance with an embodiment of the present disclosure. For example, illustrative computing device 500 can perform all or part of the processes described herein. As shown, computing device 500 includes one or more processors 502, a volatile memory 504 (e.g., random access memory (RAM)), a non-volatile memory 506, a user interface (UI) 508, one or more communications interfaces 510, and a communications bus 512.

Non-volatile memory 506 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 508 may include a graphical user interface (GUI) 514 (e.g., a touchscreen, a display, etc.) and one or more input/output (I/O) devices 516 (e.g., a mouse, a keyboard, a microphone, one or more speakers, one or more cameras, one or more biometric scanners, one or more environmental sensors, and one or more accelerometers, etc.).

Non-volatile memory 506 stores an operating system 518, one or more applications 520, and data 522 such that, for example, computer instructions of operating system 518 and/or applications 520 are executed by processor(s) 502 out of volatile memory 504. In one example, computer instructions of operating system 518 and/or applications 520 are executed by processor(s) 502 out of volatile memory 504 to perform all or part of the processes described herein (e.g., processes illustrated and described with reference to FIGS. 1 through 4). In some embodiments, volatile memory 504 may include one or more types of RAM and/or a cache memory that may offer a faster response time than a main memory. Data may be entered using an input device of GUI 514 or received from I/O device(s) 516. Various elements of computing device 500 may communicate via communications bus 512.

The illustrated computing device 500 is shown merely as an illustrative client device or server and may be implemented by any computing or processing environment with any type of machine or set of machines that may have suitable hardware and/or software capable of operating as described herein.

Processor(s) 502 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 502 may be analog, digital, or mixed signal. In some embodiments, processor 502 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 510 may include one or more interfaces to enable computing device 500 to access a computer network such as a Local Area Network (LAN), a Wide Area Network (WAN), a Personal Area Network (PAN), or the Internet through a variety of wired and/or wireless connections, including cellular connections.

In described embodiments, computing device 500 may execute an application on behalf of a user of a client device. For example, computing device 500 may execute one or more virtual machines managed by a hypervisor. Each virtual machine may provide an execution session within which applications execute on behalf of a user or a client device, such as a hosted desktop session. Computing device 500 may also execute a terminal services session to provide a hosted desktop environment. Computing device 500 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
   receiving, by a computing device, a request to migrate a logical unit number (LUN) from a source array to a target array;
   responsive to a determination that a memory size of the LUN exceeds a memory size threshold, by the computing device:
      dividing the LUN into a plurality of partitions;
      creating a number of sessions corresponding to the plurality of partitions, wherein each session of the created sessions is operable to migrate data from a partition of the plurality of partitions; and
      initiating the created sessions to start copying data from the respective partitions in parallel; and
   responsive to a determination that the memory size of the LUN does not exceed the memory size threshold, by the computing device:
      creating a single session operable to migrate data from the LUN; and
      initiating the single session to start copying data from the LUN.

2. The method of claim 1, wherein the plurality of partitions is based on sizes of partitions passed with the request to migrate the LUN.

3. The method of claim 1, wherein the plurality of partitions is based on use of a trained model to determine sizes of partitions.

4. The method of claim 1, wherein each session of the created sessions is assigned a priority.

5. The method of claim 4, wherein the priority assigned to each session is based on priorities specified for the plurality of partitions passed with the request to migrate the LUN.

6. The method of claim 4, wherein the priority assigned to each session is based on access data maintained for the plurality of partitions.

7. The method of claim 1, wherein each session of the created sessions is assigned a mode of operation for migrating the plurality of partitions.

8. The method of claim 7, wherein the mode of operation includes a cold pull.

9. The method of claim 7, wherein the mode of operation includes a hot pull.

10. The method of claim 7, wherein the mode of operation includes a hot pull with donor update.

11. A system comprising:
    one or more non-transitory machine-readable mediums configured to store instructions; and
    one or more processors configured to execute the instructions stored on the one or more non-transitory machine-readable mediums, wherein execution of the instructions causes the one or more processors to carry out a process comprising:
       receiving a request to migrate a logical unit number (LUN) from a source array to a target array;
       responsive to a determination that a memory size of the LUN exceeds a memory size threshold:
          dividing the LUN into a plurality of partitions;
          creating a number of sessions corresponding to the plurality of partitions, wherein each session of the created sessions is operable to migrate data from a partition of the plurality of partitions; and
          initiating the created sessions to start copying data from the respective partitions in parallel; and
       responsive to a determination that the memory size of the LUN does not exceed the memory size threshold, by the computing device:
          creating a single session operable to migrate data from the LUN; and
          initiating the single session to start copying data from the LUN.

12. The system of claim 11, wherein the plurality of partitions is based on sizes of partitions passed with the request to migrate the LUN.

13. The system of claim 11, wherein the plurality of partitions is based on use of a trained model to determine sizes of partitions.

14. The system of claim 11, wherein each session of the created sessions is assigned a priority.

15. The system of claim 14, wherein the priority assigned to each session is based on priorities specified for the plurality of partitions passed with the request to migrate the LUN.

16. The system of claim 14, wherein the priority assigned to each session is based on access data maintained for the plurality of partitions.

17. The system of claim 11, wherein each session of the created sessions is assigned a mode of operation for migrating the plurality of partitions, the mode of operation including one of a cold pull, a hot pull, and a hot pull with donor update.

18. A non-transitory machine-readable medium encoding instructions that when executed by one or more processors cause a process to be carried out, the process including:
    receiving a request to migrate a logical unit number (LUN) from a source array to a target array;
    responsive to a determination that a memory size of the LUN exceeds a memory size threshold:
       dividing the LUN into a plurality of partitions;
       creating a number of sessions corresponding to the plurality of partitions, wherein each session of the created sessions is operable to migrate data from a partition of the plurality of partitions; and
       initiating the created sessions to start copying data from the respective partitions in parallel; and
    responsive to a determination that the memory size of the LUN does not exceed the memory size threshold, by the computing device:
       creating a single session operable to migrate data from the LUN; and
       initiating the single session to start copying data from the LUN.

19. The machine-readable medium of claim 18, wherein each session of the created sessions is assigned a priority.

20. The machine-readable medium of claim 18, wherein each session of the created sessions is assigned a mode of operation for migrating the plurality of partitions, the mode of operation including one of a cold pull, a hot pull, and a hot pull with donor update.

* * * * *